United States Patent
Franke et al.

(10) Patent No.: US 6,507,869 B1
(45) Date of Patent: Jan. 14, 2003

(54) METHOD AND APPARATUS FOR ASSET TRACKING OF NETWORK ATTACHED DEVICES

(75) Inventors: Hubertus Franke, Cortland Manor, NY (US); Yurij Andrij Baransky, Montrose, NY (US); Pratap Chandra Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,865

(22) Filed: Apr. 28, 1999

(51) Int. Cl.[7] ............................................. G06F 15/173
(52) U.S. Cl. ..................... 709/224; 709/220; 709/227
(58) Field of Search ................................. 709/244, 220, 709/224, 227

(56) References Cited

U.S. PATENT DOCUMENTS 6,061,454 A * 5/2000 Malik et al. ................. 380/278
6,282,575 B1 * 8/2001 Lin et al. ..................... 709/244

* cited by examiner

Primary Examiner—John A. Follansbee
(74) Attorney, Agent, or Firm—Douglas W. Cameron; Anne Vachon Dougherty

(57) ABSTRACT

A method and apparatus for tracking assets in a computer network. More specifically, a host identification device monitors address identification packets transmitted from host devices connected to the host identification device in a network. The host identification device then stores the physical and protocol addresses of the host devices as indicated in these packets. When receiving a request packet from another device, the host identification device transmits the stored physical and protocol addresses to the requesting device.

12 Claims, 7 Drawing Sheets

APPLICATION | | DATA |
| --- | --- |

TCP (OR) UDP

| TCP Hdr | DATA |
| --- | --- |
| UDP Hdr | DATA |

IP

| IP Hdr | TCP/UDP Hdr | DATA |
| --- | --- | --- |

LINK/PHYSICAL
(EN, TR, FDDI)

| FRAME Hdr | IP Hdr | TCP/UDP Hdr | DATA | TRAILER |
| --- | --- | --- | --- | --- |

FIG.2
PRIOR ART

| DESTINATION PHYSICAL ADDRESS |
| --- |
| SOURCE PHYSICAL ADDRESS |
| ETHERNET=X'0800 |
| DATA=IP-DATAGRAM |
| FRAME CHECK SEQUENCE |

FIG.3
PRIOR ART

| VERS. | HdrLen | TYPE OF SERVICE | TOTAL LENGTH OF DATAGRAM | |
| --- | --- | --- | --- | --- |
| IDENTIFICATION | | | FLAGS | FRAGMENT OFFSET |
| TIME TO LIVE | | PROTOCOL | HEADER CHECKSUM | |
| SOURCE IP ADDRESS | | | | |
| DESTINATION IP ADDRESS | | | | |
| OPTIONS<br>STRICT AND LOOSE SOURCE ROUTING, RECORD ROUTING, TimeStamp,<br>SECURITY, PADDING | | | | |
| DATA | | | | |

FIG.4
PRIOR ART

| TYPE=8 OR 0 | CODE | CHECKSUM |
|---|---|---|
| IDENTIFIER || SEQUENCE NUMBER |
| DATA |||

FIG.5
PRIOR ART

| SOURCE PORT | DESTINATION PORT |
|---|---|
| LENGTH | CHECKSUM |

FIG.6
PRIOR ART

| CODE(REQ/REPLY) | HARDWARE TYPE | LENGTH | HOPS |
|---|---|---|---|
| TRANSACTION ID ||||
| SECONDS ||  FLAGS FIELD ||
| CLIENT IP ADDRESS ||||
| ASSIGNED IP ADDRESS ||||
| SERVER IP ADDRESS ||||
| ROUTER IP ADDRESS ||||
| CLIENT HARDWARE ADDRESS ||||
| SERVER HARDWARE ADDRESS ||||
| BOOT FILE NAME ||||
| VENDOR SPECIFIC AREA ||||

FIG.7
PRIOR ART

METHOD AND APPARATUS FOR ASSET TRACKING OF NETWORK ATTACHED DEVICES

TECHNICAL FIELD

This invention relates to a method and apparatus for tracking assets in a communications network.

BACKGROUND AND PRIOR ART

Asset Tracking Systems (ATS) are typically central components of inventory control and system management. Within a networked computer environment, ATS utilize client/server technology build on top of standard network protocols to query individual networked computers for a list of their assets and components which is then maintained in some inventory or asset database. However, the physical location of a computer system can not be queried dynamically through standard protocols and hence current ATS rely on people manually keeping the asset location data base current. Nevertheless, dynamically tracking the approximate physical locations of computers (particularly workstations) in an enterprise is a highly desirable feature. What is missing in today's tracking systems is the automatic identification of the physical location of the computer.

In a broader context the determination of the physical location of a device within its environment is primarily based on attaching sensors to devices and using radio frequency identification (RFI) as described in U.S. Pat. Nos. 5280159, 5785181, 5611051, 5608193, which are hereby incorporated by reference. Best known is the EAZY Pass System used at Toll Booths around the country. These methods are inadequate as they require that the sensor pass in close proximity of a detection device which initiates the radio frequency identification and receives the response.

In current local area networks (LAN) systems network attached devices, such as computer and printers, identify themselves to the other network attached devices through various standardized protocols. As an example of the various identification processes in today's network, we will describe an Internet Protocol (IP) based system. Here, a computer connected to a subnet finds the address of any other computer in the same subnet by following standardized address resolution and identification protocols.

Since this invention utilizes standard network protocols, it is imperative for the understanding of this invention to provide a review of the state of the art in networks and device identification as well as their limitation with respect to identifying the physical location of network attached devices. To that extent we incorporate the following literature on standard network protocols [1],[2] and [3] by reference.

Shown in FIG. 1 is a typical LAN. A LAN is generally constructed of several subnetworks (100), each comprised of a set of devices, such as computers (101), printers (102), file servers (103) and splitters (104). The subnet (100) is typically connected to the rest of the network via gateway (105) and routers (106). Network protocols follow a layered approach, thus defining a protocol stack, shown in FIG. 2. The bottom layer, or physical layer, is comprised of the physical network medium, and specifies the electrical characteristics, the connectors and the hardware carrying data. The data link layer utilizes this medium to define units of data, called frame or packet, consisting of frame header, frame data and optional frame trailer. Popular data link protocols are Ethernet, token ring, FDDI, ISDN, ATM, SLIP to mention a few. Layered on top of the data link are standard protocols such as IP, DecNET and NetBEUI, amongst others. The higher the protocol layer the more abstract are the services. For instance the lower layers often implement an unreliable communication medium, while higher level layers provide a reliable communication medium on top of unreliable mediums. The data-load of lower level packets typically embodies the entire packet of the next higher layer. For instance the Ethernet packet or frame, shown in FIG. 3, embodies as its data-load the IP packet, commonly referred to as the IP datagram. The IP packet format is shown in FIG. 4. The IP datagram's data section embodies higher level packets defined for protocols such as UDP or TCPIP.

Referring to FIG. 1, within a network, network attached devices are referred to as hosts (101,102,103,105). Dependent on the layer of the protocol stack, hosts are addressed by different names or protocol addresses, short addresses. For instance, in a particular name domain a host might be identified by a more descriptive host name address such as "webserver.watson.ibm.com". In the IP domain this host might be known by its IP address (e.g. 9.2.220.54). In the link layer the host might be identified by the 48-bit physical address of its Ethernet adapter. The physical address is often also referred to as the MAC (machine access control) number and is a globally unique number that is encoded into the network adapter at manufacturing time. In order to generate the packets as shown in FIG. 2, address translation has to take place in order to move from one layer of the protocol stack to a lower layer. For instance, domain name servers translate between host names and IP addresses. Note that a particular host can hold multiple addresses at a particular level. For instance, a host might have several communication adapters and therefore multiple physical addresses.

Let X and Y be two hosts attached to a subnet and further let IP(X) and IP(Y) be their respected IP address for a given physical protocol (e.g. Ethernet). If X wants to communicate with Y, then for the purpose of communicating over a particular physical layer, the IP address IP(Y) must be first translated into the physical address PA(Y) of Y for a particular physical protocol. For this purpose an address resolution protocol (ARP) module is consulted that caches translations between IP addresses and physical addresses. If such a translation exists, then IP(X) can send to IP(Y) by copying the PA(X) into the source and PA(Y) into the destination of the packet frame. If no such translation is available, the physical address PA(Y) must be discovered first. For this purpose the address resolution protocol (ARP) is utilized. Here, first a particular frame is broadcast on a subnet that contains the ARP request command token, the PA(X) as the source of the packet, a wild card target physical address PA(*), the higher layer source and destination addresses, which in the case of IP are the source IP address IP(X) and the target IP address IP(Y). Note, that the ARP is shared by all physical link protocols, such as IP, NetBEUI, etc. Since the ARP packet is broadcast with a wild card target PA(*), every host attached to the subnetwork, picks up the packet and pushes it up its communications stack. If the target IP(Y) address matches any computer on the subnet, this computer will respond with an ARP reply to the interrogator by means of exchanging the IP target and source addresses in the request packet, setting the physical source address to PA(Y) and the physical target address to PA(X). X will pick up this ARP reply packet, and store the translation <IP(Y),PA(Y)> contained therein in its ARP module. The translation is typically discarded after some time to ensure that translations are somewhat up to date. For instance, if a host disconnects from the network, packets addressed to this host will simply be discarded and higher level protocols will be notified of the communication error. A variant of the ARP called reverse ARP (RARP) helps a node find out its own higher layer address. A host can broadcast a query requesting its higher layer address and stating its physical address. A server that is configured with a physical to higher layer address table responds to such queries by supplying the assigned higher level address, for instance, the IP address in case of IP.

The IP protocol defines a particular set of control messages, known as the Internet Control Message Protocol, (ICMN). ICMP's functions are an essential part of IP. All hosts and routers must be able to generate ICMN messages as well as process the ICMN messages that they receive. For instance, ICMP provides the means to implement higher level protocols to examine the state or characteristics of the other hosts and routers in the network or to configure the network (e.g. router function). Of particular interest to this invention are the ICMP query functions which are utilized to implement the popular IP "ping" service. A "ping <T>" establishes whether a host <T>, as identified by its IP address, is connected to and properly configured to communicate via the network with other hosts and if so, the ping measures the transfer time of a packet between the issuing host and host <T>. As a side-effect of issuing a "ping <T>" request, address resolution will take place on those levels of the communication stack, for which no proper translation to the next lower level exists. For instance, if the physical address of the target host is unknown, the ARP request is automatically issued to discover the PA(T). The service then continues to issue an ICMP ECHO packet to T. Once received by T, T must respond with an ICMP ECHO_REPLY message. The format of the request and reply is shown in FIG. 5. ICMP messages are carried in the IP datagrams, which have ordinary IP headers, wherein the type of service is set to "0" to indicate that there is no special priority to these packets and the protocol is set to "1" to indicate that this is an ICMP message. Within the dataload of the ECHO request, the sender can send any data, and the responder should send back the same data it received to allow the sender to examine potential transmission problems.

Another network protocol of relevance to this invention is the BOOTP protocol. The bootp protocol itself is layered on top of standard UDP (User Datagram Protocol), which enables applications to send individual message to one another without service guarantees. UDP utilizes source and destination ports to which identify the sending and receiving application. These are identified in the UDP header of a message, as shown in FIG. 6. UDP reserves several ports for system specific management, of which BOOTP occupies two, one for the server (port "67") and one for the client (port "68"). UDP is layered on top of IP with the IP protocol set to "17". The UDP protocol is described in more detail in [1]. The BOOTP protocol allows a client computer system to boot from the network, more particularly from a boot server. The packet format used within the BOOTP is shown in FIG. 7. The client issues a BOOTP request. If it does not know the server's IP address, then it broadcasts the message. If it does not know its own IP address, then it sets it to 0.0.0.0 in the packet. The server that listens to the UDP port 67 on the target host receives the datagram, looks up the clients configuration, assigns an IP address and builds a BOOTP reply packet that includes further information such as the boot file from where to the boot image is retrieved. The client receives the BOOTP reply packet, sets its own IP address and can initiate the bootstrap protocol. This process is further described in [3].

Having thus described the standard identification protocol, namely ARP for address resolution, the ICMP ECHO and ECHO_REPLY exchange and the BOOTP protocol, and having further examined the standard protocol packet formats, it should be apparent that there is currently no integrated method in these protocols, that allow the determination of the physical location of hosts in network attached systems.

SUMMARY OF THE INVENTION

This invention provides a system that enables automatic tracking of network attached devices. The invention is based on existing LAN protocols, but adds hardware to the network outlet in each room. To that extent, our invention differs from RFI based systems as hardware is added to the network outlet and not to the device itself. Further, as is described in the preferred embodiment, no new network protocols have to be created.

Though many protocols do concurrently coexist on all levels of the protocol stack (e.g. TCP vs. UDP or IP vs. DecNET), this invention is illustrated using the Ethernet, IP, and UDP, because these are the most widely used standard protocols with respect to machine configuration and setup. To those skilled in the art, it is obvious that the apparatus, methods and algorithms are not limited to Ethernet, IP and UDP, but are equally applicable to other existing and emerging network protocols and protocol stacks.

The apparatus of this invention comprises a physical device, referred to as a Host Identification Device (HID), that is connected to the network outlet known as the network attachment point (NAP), e.g. a RJ45 connector plate in the wall, or a splitter box. The HID provides the same connection to the equipment as does the NAP and forwards all requests between the network and the attached hosts. To this extent, the HID functions like a pass through device in the system. However, when an ICMP ECHO_REPLY is observed by the HID on the physical link attached to it, it will store the responders physical address PA and corresponding IP address. For a number of software purposes, the HID is yet another network adapter attached to the network. As such it has its own unique physical address and responds to all ARP and ECHO requests itself. The HID responds to an ECHO request by transferring all the stored PA/IP address association information. Hence, to a central tracking system, this apparatus provides the physical and IP addresses of hosts attached to an HID. The attachment or connection to the HID can be any physical fink, wire connection, or wireless connection through either radio or optical communication systems. Since, for all practical purposes, the HID is integrated into the NAP, the physical address of the HID can be registered into a database together with its physical location at the time of the NAP installation. This database has to be updated if and only if the NAP is physically relocated and not if any computer equipment that is connected to the HID is relocated. As described above, this apparatus and method describes a mechanism to dynamically and uniquely identify the physical location of network attached equipment.

BRIEF DESCRIPTION OF THE DRAWINGS

FIG. 2 schematically illustrates the protocol stack used by many network protocols.

FIG. 3 graphically illustrates the Ethernet frame carrying an IP datagram.

FIG. 4 schematically illustrates the general IP packet format.

FIG. 5 schematically illustrates the Internet Control Message Protocol (ICMP) packet format for ECHO request and ECHO reply ICMP messages.

FIG. 6 schematically illustrates the format of UDP header.

FIG. 7 schematically illustrates the BOOTP packet format.

PREFERRED EMBODIMENT

Figure 1:
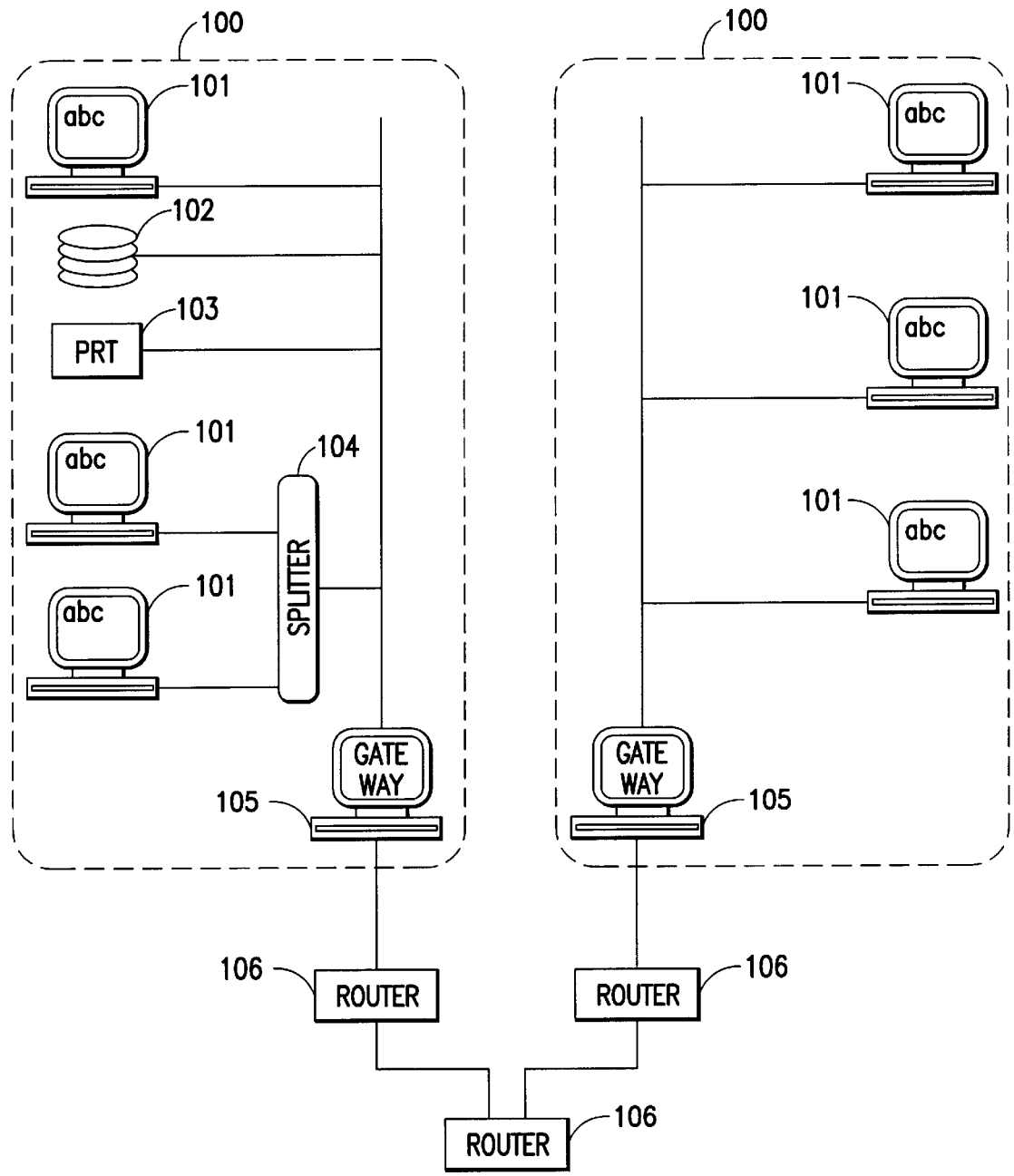
FIG. 1 schematically illustrates a network having a number of subnetworks with attached network devices.
Figure 8A:
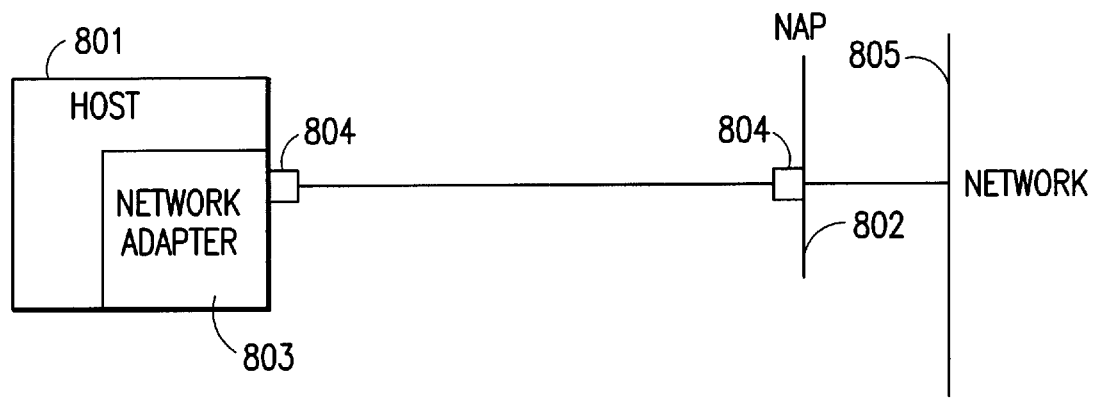
FIG. 8 schematically illustrates the standard and enhanced network attachment points for host to network connections.
Figure 8B:
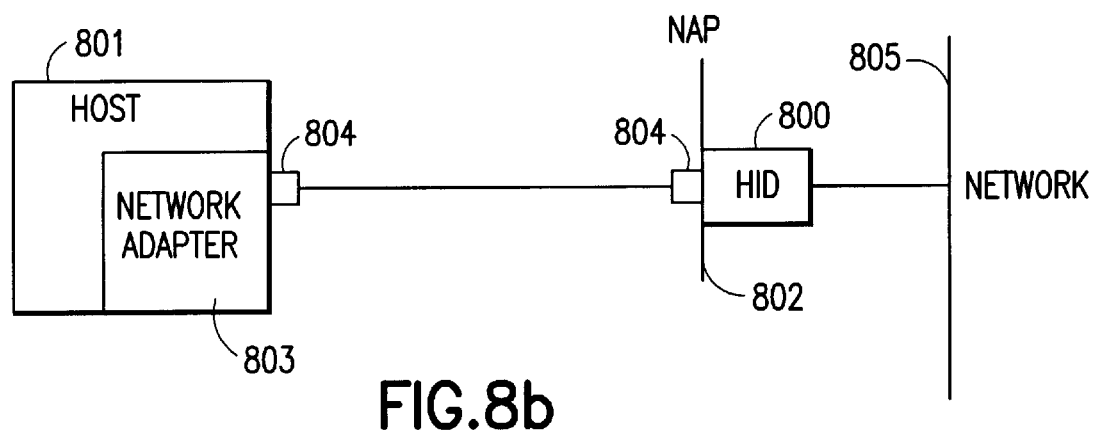

Shown in FIG. 8(b) is a host identification device HID (800) be placed between the hosts (801) and the network (805) at some fixed location (e.g. room). Preferably, the HID (800) is integrated into the network attachment point NAP (802), for instance the wall jack or the splitter box. The host provides a network adapter (803) which is connected via wiring (e.g. coax) and connectors (e.g. RJ45) (804) to the NAP. FIG. 8 shows the standard and enhanced network attachment points NAP for host to network connection. The task of the HID is to capture the physical addresses of hosts attached to the HID/NAP and send the list of physical addresses via standard protocols to the central agent if probed. For interaction with asset tracking systems (ATS), the HID itself has a unique IP address and a unique physical address and hence behaves like any other host on the network. To that extend we describe in this preferred embodiment the following methods:

1. Initialization of the HID, in particular the assignment of an IP address.
2. Capturing the physical addresses of HID attached hosts.
3. Initiation of the location tracking process.
4. Information retrieval by an asset tracking system using standard protocols.

Figure 9:
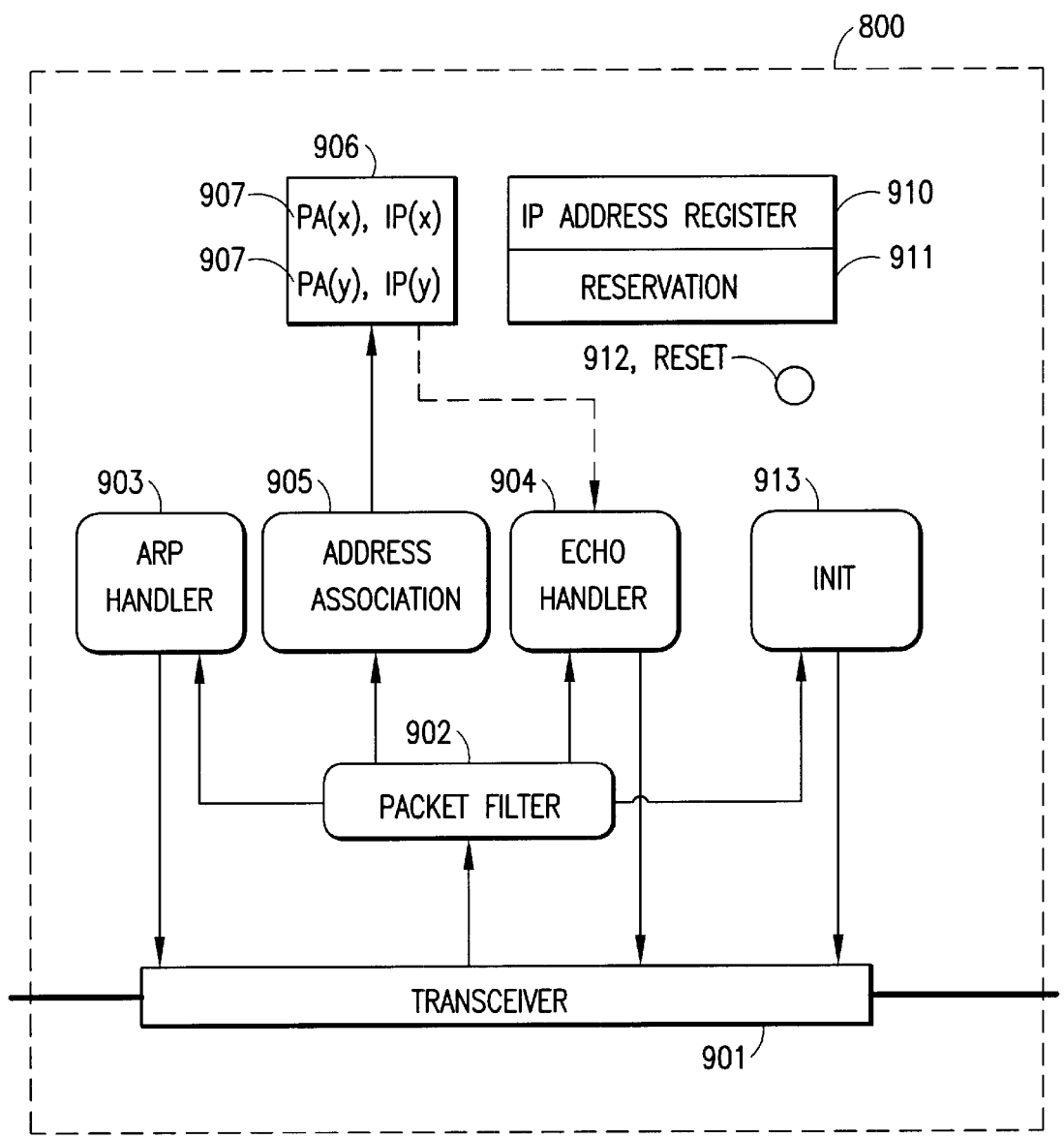
FIG. 9 graphically illustrates the architecture and the modules of the host identification device.

The general architecture of the HID is shown in FIG. 9. The HID (800) itself functions like a network snooper and identifies frames that are of relevance to one of the four points mentioned in the previous paragraph. To implement this functionality, the HID functions as follows. Within the link transceiver (901), the HID snoops on every frame passing through the transceiver and absorbs each frame and forwards it to a Packet-Filter (902). Naturally the packet is also available to every other host on the same subnet.

Of particular interest to this invention are four kind of packets:

1. ICMP ECHO_REPLY messages that are flowing towards the net and not towards the HID attached hosts. The IP address and the physical address of the responding host are contained within the messages as described in the prior art section and are captured by the HID.
2. ICMP ECHO_REQUEST messages that are destined to the HID. As will be described further on, we utilize these messages to initiate and retrieve the captured IP and physical addresses of attached hosts.
3. UDP BOOTP messages that are destined to the HID. These messages contain the IP address that is to be assigned to HID at installation time.
4. ARP packets, which must be answered by any host on the network.

Figure 10:
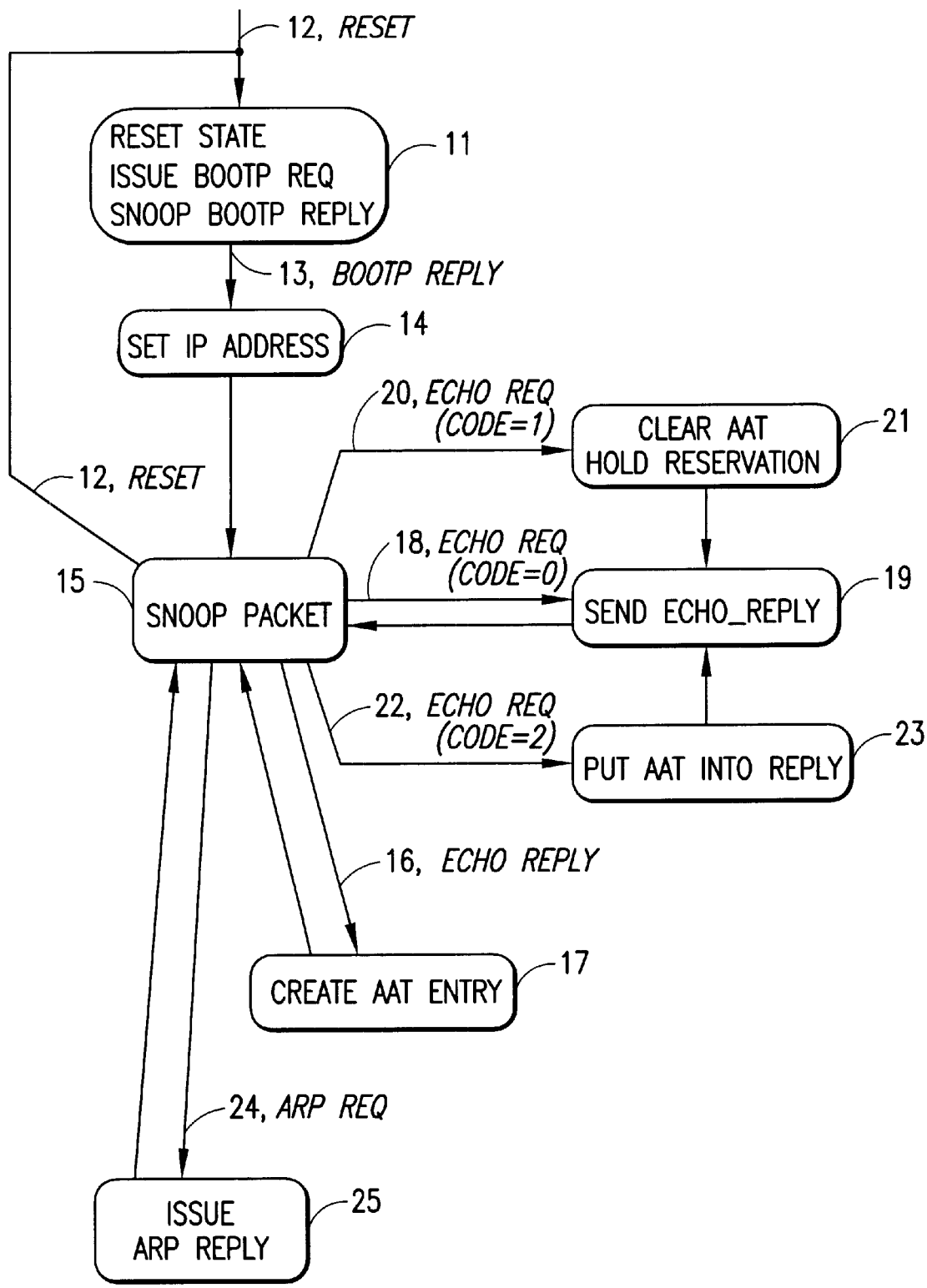
FIG. 10 is a flow diagram illustrating the operation of the host identification device.

The general flow diagram for the HID apparatus is shown in FIG. 10. As shown, after an initialization phase, the HID snoops for particular packets, which then trigger actions, that are described in detail below.

Referring to FIGS. 9–10, shown is the mechanism (11) and module (913) that initializes the HID and assigns an IP address to the HID. The IP address of the HID is initially assigned to 0.0.0.0, which does not represent a legal host IP address. The HID is equipped with a reset button (912). If the reset button is hit (12), the HID puts out a BOOTP request packet which can be hard coded into the apparatus (the content and nature of the BOOTP protocol was described in the prior art section). Once the reset button is hit and the BOOTP request packet was put onto the net, the packet filter 902 tries to identify a BOOTP reply (13) destined for the HID. If one is received, the assigned IP address embodied in the reply is stored (14) in the IP address register (910), and the HID is operational. All other information in the reply can be discarded. The packet filter is then enabled to snoop for the other packets as described above and ignore further BOOTP replies. The HID stops snooping for further BOOTP replies and starts snooping for all other relevant packets (15). The HID keeps issuing the BOOTP request until a BOOTP reply is received. The HID reenters this initialization phase if the reset button is hit again. For this reason it is preferrable to hide the reset button from the ordinary user. The server that replies to the BOOTP request of the HID, should have knowledge about the physical address of the HID. In one embodiment the BOOTP reply can be issued by a BOOTP server located on the network, that typically supplies the IP address and bootable image if needed. In another embodiment, at installation time, a portable device can be plugged into into the NAP, and this device would then respond to the BOOTP request and assign a particular IP address that would be entered into the tracking system. Furthermore, it is possible to issue the BOOTP sequence before the HID is actually connected to the network. In this way, it is ensured that the BOOTP reply is not created by any other boot server on the network. In an alternative embodiment, the reverse ARP protocol is utilized in the same manor as the BOOTP protocol.

The packet filter (902) identifies ICMP ECHO_REPLY messages by examining four entities in the frame to be of particular value. The frame header type code must be the IP protocol code number (="0" in the Ethernet Protocol) to identify an IP packet, the IP header's protocol number must be the ICMP protocol code (="1") to identify an ICMP message, the ICMP header's type must identify an ECHO_REPLY (="0") and the flow of the message must be towards the network. The message flow direction is important as we are not interested in replies to ECHO requests originating by one of the HID attached hosts. Once a proper ICMP ECHO_REPLY message is identified (16), the HID retrieves (a) the source physical address PA(S) from the frame header and (b) the source IP address IP(S) from the IP header and creates an address association <PA(S), IP(S)>which is passed on to the address association module (905). The address association module searches an address association table AAT (906) for an entry that contains the PA(S) and if it finds one, the module deletes it and enters a newly created entry <PA(S), IP(S)>(907) into the AAT (17). Hence, at most one entry with PA(S) can exist at any given time. Since splitters (104) enable the placement of several hosts beyond the HID, the size of the AAT must be sufficient to hold at least one entry at any given time for each host attached to the HID. The number of hosts, or more precisely the number of network adapters (803), attached to a single HID is limited to 252, as at most 254 hosts can form a subnet and at least one gateway as well as one IP address is required for the HID.

An asset tracking system must be able to interact with an HID to retrieve the established physical location information. The preferred method of interaction with the HID is through ICMP ECHO request messages which are handled in the ECHO handler module (904). Two functions must be implemented: (a) resetting the AAT in order to avoid stale information in the AAT, for instance when a host is disconnected from the HID, and (b) requesting the content of the AAT. We implement these functions by utilizing unused command codes of the ICMP ECHO request message. As is be described below, a sequence of requests is issued to implement the retrieval of the physical location information using the extended ICMP ECHO requests. Since any host can send an ECHO request to the HID at any given time, this can lead to potential problems with respect to the proper implementation of the identification process. In particular, we must ensure that once the asset tracking system starts the identification process by resetting the AAT, that if other hosts interfere with this process, e.g. also send a AAT reset, then the asset tracking system will be informed about it and it can restart its operation.

ICMP ECHO requests targeting the HID are identified by the frame header's destination physical address matching the PA(HID), the frame protocol identifying the IP protocol, the IP header identifying the ICMP protocol and the ICMP type identifying an ICMP ECHO request. Referring to FIG. 6, the ICMP ECHO message contains a code, an identifier and a sequence number that is selected by the source of the message (e.g. the ping service). In standard protocol the code is ignored for the ECHO and ECHO_REPLY message types and code=0 is assumed to be the standard setting when issuing an ECHO request, such as in the "ping" service. In the "code=0" (18) case, the ECHO handler (904) merely issues the standard ECHO_REPLY by switching source and target addresses and message type (19).

To avoid interference with the AAT update and retrieval process initiated by an asset tracking system, we provide an uncommitted reservation mechanism for manipulating the state of the HID. The reservation mechanism is uncommitted because any host can issue a reservation at any time, and because the last host to issue a reservation request holds the rights for the information retrieval. If a host, after having lost its reservation due to interference by another host, issues subsequent requests, an error is returned. The error return enables the host to restart the entire transaction starting with the resetting of the AAT. This mechanism is in contrast to a lock, which yields the reservation to the first requester, but has the drawback that if the owning requester terminates before releasing the lock, then the HID becomes inaccessible. A reservation can be issued by sending an ECHO request with code=1 (20), which has the side effects that the AAT (906) and the reservation (911) are cleared, and that the IP address and identifier of the ICMP ECHO message are stored (21) as the new reservation (911). The ECHO_REPLY to this request is the standard reply as with code =0 (19). An ECHO request with code=2 (22) is responded to with dumping the current state of the AAT (23) into the data portion of the ECHO_REPLY message (19). In an alternative embodiment, the physical address of the HID is additionally transferred within in the data portion of the reply (19). This enables a tracking system to verify the origin of the message. If an ECHO request with code=2 is received which does not match the current reservation (911), then an ECHO_REPLY is issued with code =1 to indicate that the operation has failed; otherwise, the code of the reply is 0. In the case of a failure, the issuer can restart the operation with another reservation request.

The last packets the HID has to respond to are ARP request packets, and the response is handled in the ARP Handler Module (903). These responses are necessary so that other hosts such as the asset tracking system can set up communication with the HID. Hence, when a ARP request is received that matches the HID's assigned IP address (24), the HID issues an appropriate reply (25) containing its own physical address PA(HD).

Figure 11:
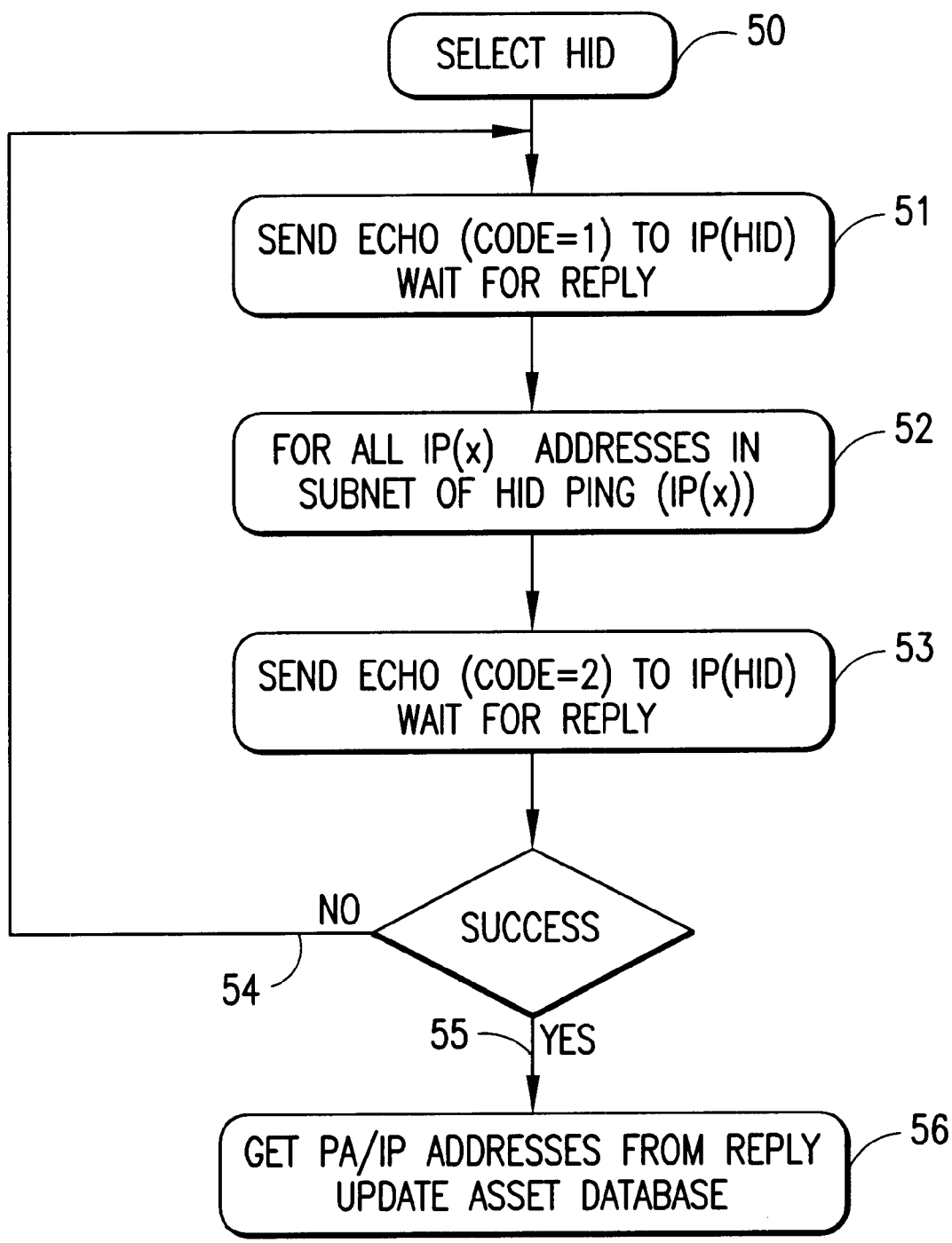
FIG. 11 is a flow diagram illustrating the operation of the asset tracking system.

Given the description of the behavior of the HID, an asset tracking system can discover the list of active hosts and their physical location following the flow diagram shown in FIG. 11. Within a given subnet, the ATS knows the IP addresses of all its HIDs from the asset tracking database that was maintained when each HID was installed. The ATS selects an HID (50) and sends an ECHO (code=1) request to one or more, preferably all, HIDs within the subnet to reset their AAT and hold the reservation (51). If no reply is received in a certain time interval, the ATS reissues the ECHO request. Then, the ATS requests the "ping" service for all potential IP addresses on that subnet (52). The "ping" service issues ECHO requests. In an alternative embodiment, the ATS issues the ECHO requests directly, and waits for the reply. All hosts on the subnet will respond to their respected ECHO request. The ECHO_REPLY of a host will be picked up by the HID the host is attached to, and will be entered into the AAT of that HID. As an optimization, the HIDs on a subnet do not have to be pinged. The asset tracking system then can retrieve the AAT content via an ECHO request (code=2) (53). If the resulting ECHO REPLY indicates a failure (54), then the reservation was lost due to interference from some other entity, and the ATS has to restart with the transaction (51). If the ECHO REPLY indicates success (55), the reply contains as its data portion the AAT. The asset tracking system then updates the asset database (56) with the physical addresses and IP addresses of all the hosts indicated in the AAT content as well as the IP address of the HID. The location of each found attached host is then tied to the physical location that was registered during the installation of the HID/NAP.

In the preferred embodiment the HID is powered by a battery. Alternate power supply should be used if available. For instance in a splitter box external power is supplied and hence a battery is obsolete.

References

[1] TCPIP: Architecture, Protocols, and Applications, by Sidnie Feit,

[2] RFC 826: "An Ethernet Address Resolution Protocol", Plummer, D., November 1991.

[3] RFC 951: "Bootstrap Protocol", Croft, W. J.; Gilmore, J.; 1985 September

What is claimed is:

1. In a communications network having a plurality of devices with at least one of said devices being a host identification device connected between the network and a subset of said plurality of devices, a method of determining which of said devices are connected to said host identification device, said method comprising:

upon detecting a first signal passing through said host identification device from each of said subset of connected devices that are connected to said host identification device, said host identification device storing a physical and protocol address for each said first connected device; and upon receiving a second signal comprising a request to said host identification device from any of said plurality of devices of said network, said host identification device transmitting said stored physical and protocol addresses, wherein information is transmitted about which of said connected devices are connected to said host identification device and the physical addresses of said connected devices.

2. The method as recited in claim 1, wherein said first signal is a message comprising a physical and protocol address of said first device and wherein said first signal is transmitted in response to a request message.

3. The method as recited in claim 1, wherein said protocol address is an IP address.

4. The method as recited in claim 1, wherein said first signal is a message comprising a control message defined in the Internet Control Message Protocol (ICMP) as the ICMP Echo Reply message and wherein said first signal is transmitted in response to an ICMP Request message.

5. The method as recited in claim 1, wherein said second signal is a message comprising a control message defined in the Internet Control Message Protocol (ICMP) as the ICMP Request message and wherein said second signal is received by said host identification device only if said ICMP Request message has a target physical address of said host identification device.

6. The method as recited in claim 1, wherein said second signal is a request message comprising the physical destination address of said host identification device.

7. The method as recited in claim 1, wherein a device is a network adapter.

8. A host identification device for determining which devices in a communications network are connected to said host identification device, said host identification device comprising:

an input for detecting a first signal from any first of said connected devices that are connected to said host identification device and obtaining physical and protocol address from said connected device;

a storage component for said host identification device to store a physical and a protocol address of any said connected device based on said first signal; and a transmitter for transmitting said stored physical and protocol addresses, upon receiving a second signal comprising a request to said host identification device from any of said other devices of said network, wherein said other device receives information about which connected devices are connected to said host identification device and the physical address of said connected devices.

9. The apparatus as recited in claim 8, wherein said host identification device comprises an address association table having stored therein said physical and protocol addresses of devices connected to said host identification device.

10. The apparatus as recited in claim 8, wherein said host identification device is integrated into a network attachment point.

11. The apparatus as recited in claim 8, wherein said transmitter also transmits the physical address of said host identification device.

12. In a communications network having a plurality of devices, with at least one of said devices being a host identification device connected between said network and a subset of said plurality of devices, a program storage device readable by a machine, tangibly embodying a program of instructions executable by the machine to perform method steps for determining which of said devices are connected to said host identification device and the physical locations of said connected devices, said method comprising:

upon detecting a first signal passing though said host identification device from each of said connected devices that are connected to said host identification device, said host identification device storing a physical and a protocol address of any said connected device; and upon receiving a second signal comprising a request directed to said host identification device from any said other device of said network, said host identification device transmitting said stored physical and protocol addresses, wherein a network adapter in said other device receives information about which network devices are connected devices which are connected to said host identification device and the physical locations of said connected devices.

\* \* \* \* \*